US006861116B2

(12) United States Patent
Emmert

(10) Patent No.: US 6,861,116 B2
(45) Date of Patent: Mar. 1, 2005

(54) LASER PRINTABLE WINDOW DECAL FROM CONSTRUCTION

(75) Inventor: David Ralph Emmert, Angola, IN (US)

(73) Assignee: Moore North America, Inc., Stamford, CT (US)

( * ) Notice: Subject to any disclaimer, the term of this patent is extended or adjusted under 35 U.S.C. 154(b) by 0 days.

(21) Appl. No.: 10/342,319

(22) Filed: Jan. 15, 2003

(65) Prior Publication Data

US 2004/0137186 A1 Jul. 15, 2004

(51) Int. Cl.[7] ................................................ B32B 33/00

(52) U.S. Cl. ...................... 428/40.1; 156/247; 156/249; 156/277; 283/81; 283/94; 283/101; 428/41.7; 428/41.8; 428/42.1; 428/42.2; 428/42.3; 428/43; 428/192; 428/194

(58) Field of Search .............................. 428/40.1, 41.7, 428/41.8, 42.1, 42.2, 42.3, 43, 192, 194, 914; 283/81, 94, 101; 156/249, 247, 277

(56) References Cited

U.S. PATENT DOCUMENTS 3,799,829 A * 3/1974 Heatwole .................... 156/235
4,864,755 A * 9/1989 Owens ......................... 40/594
6,352,608 B1 * 3/2002 Garden ....................... 428/41.8

* cited by examiner

*Primary Examiner*—Nasser Ahmad
(74) *Attorney, Agent, or Firm*—Hanley, Flight & Zimmerman, LLC

(57) ABSTRACT

A window decal form is suitable for laser printing and enables ready installation of a decal to the inside of a vehicle window or the like. The window decal form construction includes a liner sheet having a front side and a back side. An adhesive release coating is disposed on the back side of the liner sheet framing a decal area. The decal area and the adhesive release coating define a label area. The label is affixed to the back side of the liner sheet covering the label area via a permanent adhesive. The decal area on the front side of the liner sheet is die cut such that the decal area is removed when the label is peeled from the back side of the liner sheet.

20 Claims, 4 Drawing Sheets

LASER PRINTABLE WINDOW DECAL FROM CONSTRUCTION

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The present invention relates to a window decal form construction and, more particularly, to a laser printable window decal form construction wherein a label including a window decal or the like can be readily removed from the form for application to a vehicle window or the like.

There are many situations where it is desirable to forward a decal by mail or the like to a recipient. The decal form should enable easy removal of the decal from the form and easy placement in a vehicle window.

A conventional construction of such a window decal form includes an adhesive with a liner on the face of the form, particularly suited for an impact printer. This form, however, is not suitable for printing by a laser printer. A laser printer needs a smooth and flush finish on the top of the paper or form in order to print without major difficulty. If the form with the adhesive and liner on the face was to be used in a laser printer it would cause problems with the printer. Laser printers typically provide high quality output at high speeds thereby resulting in more efficient production. It would thus be desirable to construct a window decal form that is suitable for laser printing.

BRIEF SUMMARY OF THE INVENTION

In order to effect laser printing on a form, the form must not have "raised material." That is, the print medium needs to be flat and smooth as it goes through a laser printer.

The window decal form construction of the present invention includes a label placed on top of a release coating surface from the back of the form, while a die cut is made into the face (front) of the form. The die cut portion is laser printed so that it will be visible through a vehicle windshield. The decal is then removed from the back. Printing on the die cut portion is in the center of the label, and there is adhesive on all four sides of the decal. The adhesive allows for the anchorage of the decal into a windshield from inside of the vehicle.

In an exemplary embodiment of the invention, the window decal form construction includes a liner sheet having a front side and a back side; an adhesive release coating disposed on the back side of the liner sheet, where the adhesive release coating frames a decal area with the decal area and the adhesive release coating defining a label area. A label is affixed to the back side of the liner sheet covering the label area via a permanent adhesive. The decal area on the front side of the liner sheet is die cut such that the decal area is removed when the label is peeled from the back side of the liner sheet. The window decal form is of a thickness suitable for a laser printer, preferably between 5–8 mils.

Preferably, the adhesive release coating is silicone. Perforations may be formed around a periphery of the label area. Additionally, an indicia section may be included in the window decal form containing indicia printed thereon. The perforations may also be disposed surrounding the indicia section. The liner sheet may be formed of paper, plastic or any other suitable material.

In another exemplary embodiment of the invention, a window decal form construction includes a liner sheet having a front side and a back side; and a label removably affixed to a label area on the back side of the liner sheet. A decal area smaller than and within a periphery of a label area on the front side of the liner sheet is die cut such that the decal area is removed when the label is peeled from the back side of the liner sheet. The window decal form is of a thickness suitable for a laser printer.

In still another exemplary embodiment of the invention, a method of constructing a window decal form having a thickness suitable for a laser printer includes the steps of providing a liner sheet having a front side and a back side; applying an adhesive release coating on the back side of the liner sheet to frame the decal area, the decal area and the adhesive release coating defining a label area; affixing a label to the back side of the liner sheet covering the label area, the label being affixed with a permanent adhesive; and die cutting the decal area on the front side of the liner sheet such that the decal area is removed when the label is peeled from the back side of the liner sheet.

BRIEF DESCRIPTION OF THE DRAWINGS

These and other aspects and advantages of the present invention will be described in detail with reference to the accompanying drawings, in which.

DETAILED DESCRIPTION OF THE INVENTION

Figure 1:
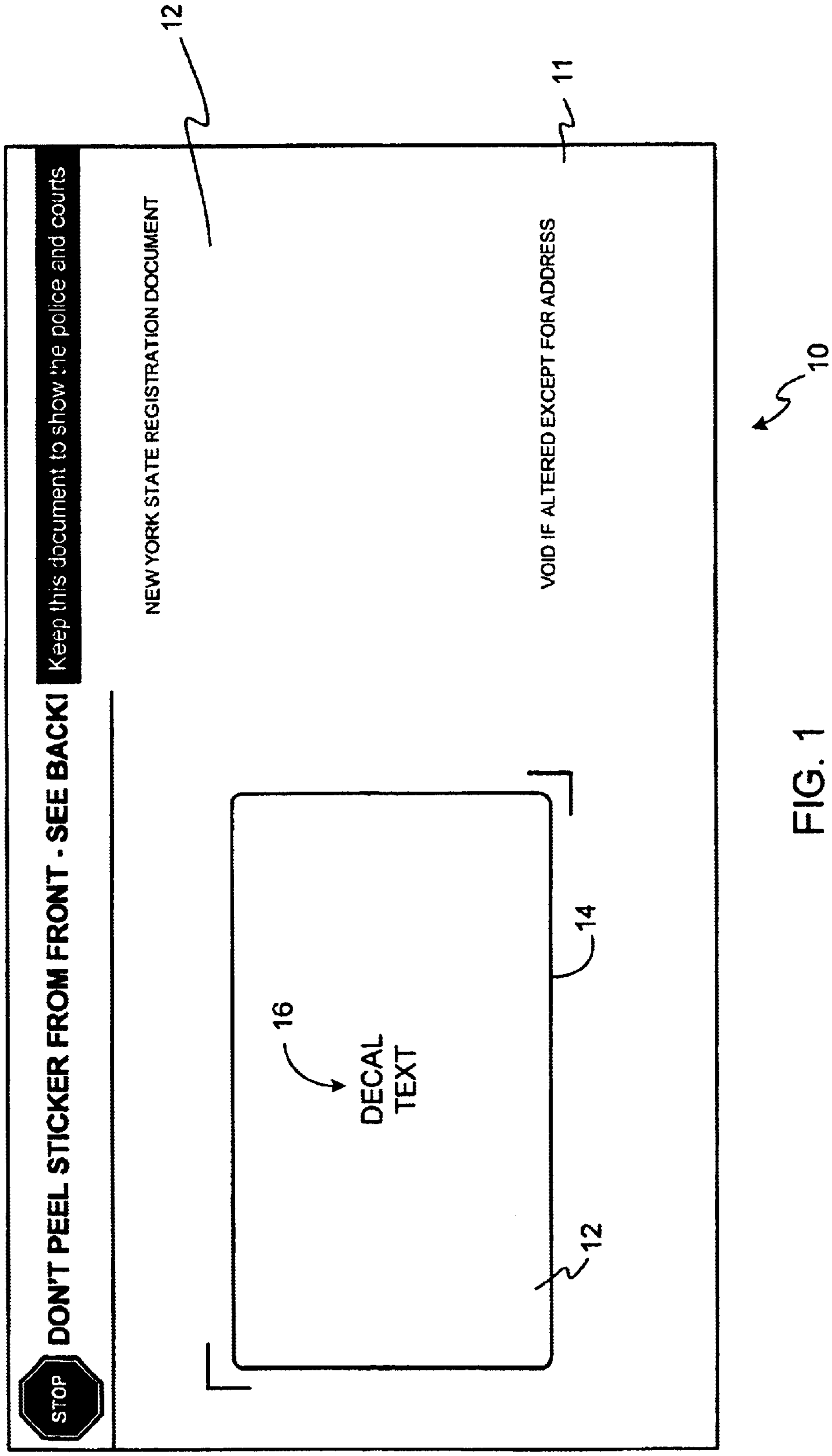
FIG. 1 shows the front side of the window decal form.

A front side of a label 10 according to the present invention is shown in FIG. 1. The front side of the label includes a decal area 12 defined by a die cut 14 in the label liner 11. Decal text 16 may be printed in the decal area 12. An indicia section 18 may also be included with the form 10 for including additional information.

Figure 2:
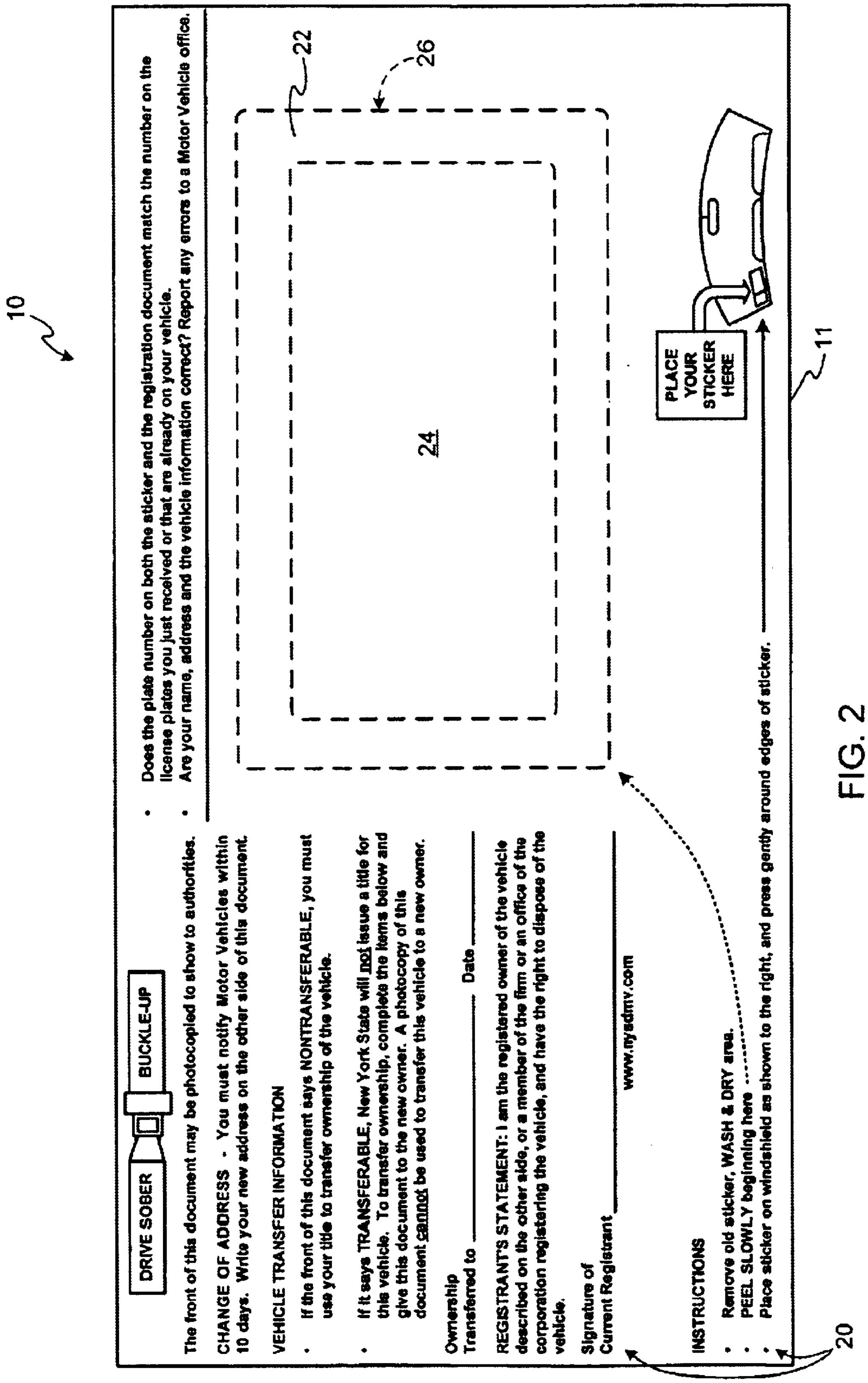
FIG. 2 shows the back side of the window decal form without a label.

The back side of the form 10 prior to application of the label (described below) is shown in FIG. 2. The liner sheet 11 includes an indicia section 20, generally opposite the indicia section 18 on the front side of the form 10. An adhesive release coating 22, such as silicone or the like, is applied to the liner sheet 11 to surround or frame a decal area 24. The adhesive release coating 22 can be applied in any conventional manner. The decal area 24 and the adhesive release coating together define a label area 26.

Figure 3:
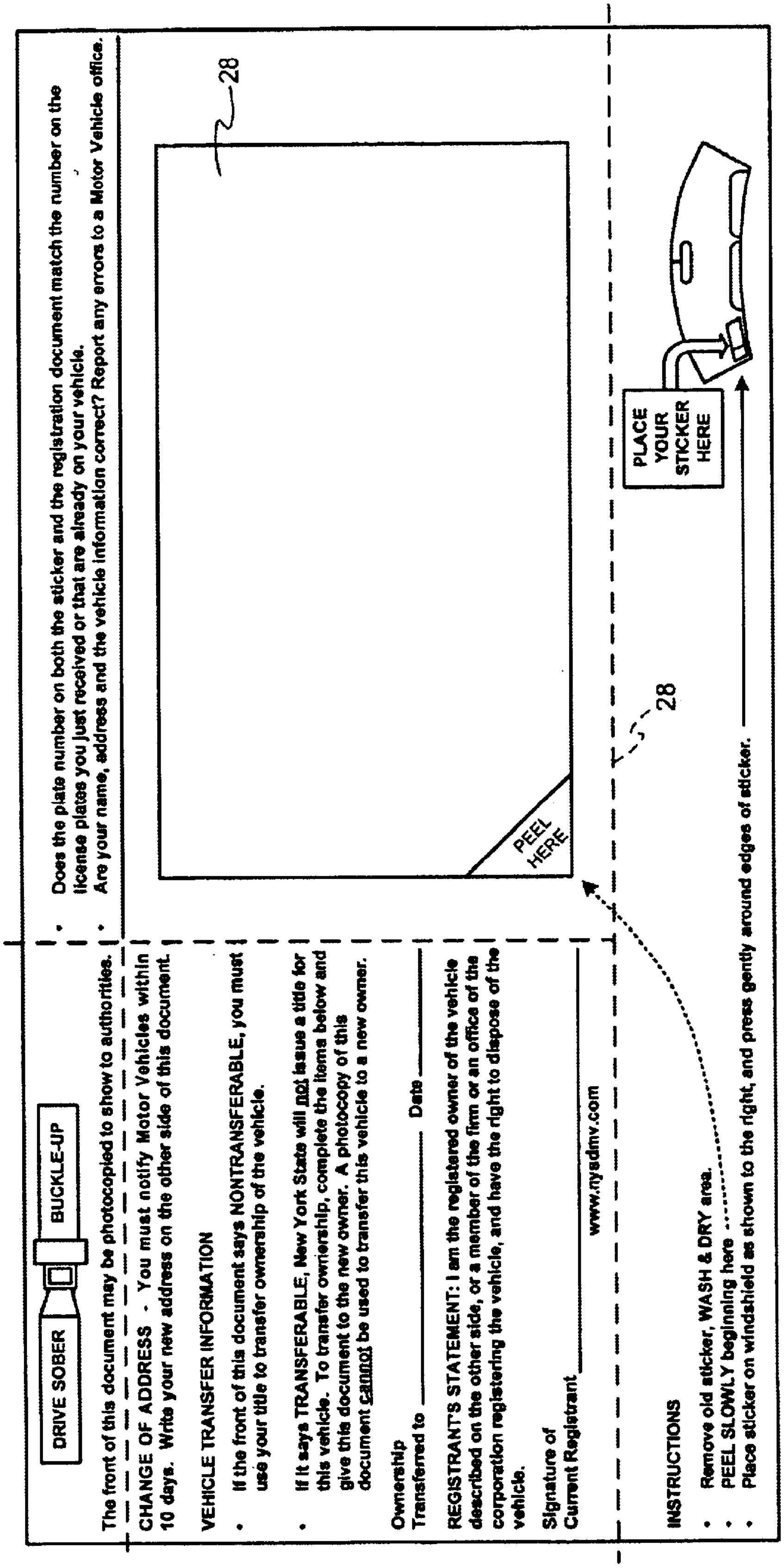
FIG. 3 shows the back side of the window decal form with the label affixed.
Figure 4:
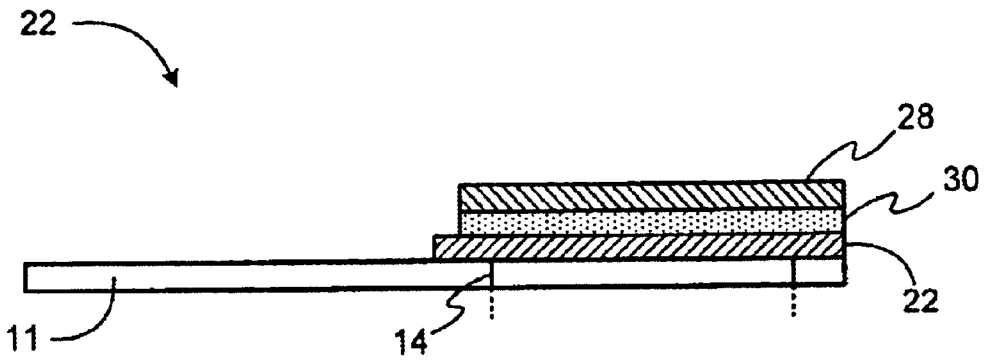
FIG. 4 is a side schematic detail view of the window decal form construction of the present invention.

With reference to FIGS. 3 and 4, the label 28 provided with a permanent adhesive 30 thereon is affixed to the back side of the liner sheet 11 covering the label area 26. A suitable adhesive is Moore P-95, although many types of adhesives may be suitable and the invention is not meant to be limited to the noted example. In view of the application of the adhesive release coating 22, the label 28 by virtue of the permanent adhesive 30 is permanently affixed to the decal area 24 while being removably fixed to the adhesive release coating 22. In this manner, when the label 28 is peeled from the back side of the liner sheet 11, the portion of the liner sheet 11 in the decal area 24 is removed from the form 10 by virtue of the die cut 14. The decal 12 is thus permanently affixed to the label 28, and an adhesive border is exposed around the decal 12 to enable the decal 12 to be affixed to the inside of a vehicle window or the like.

The liner sheet 11 may be formed of any suitable material such as paper, plastic or the like, and may also include perforations 32 (see FIG. 3) around a periphery of the label area and/or surrounding the indicia section 20.

The decal form is made from four processes. The first process is to print the liner sheet on both sides of the paper. This can be done with offset or flexo printing. A security print feature may be printed at this time on the liner sheet. The liner sheet will also receive a protective coating on one side (to protect it against chemicals).

The second process is to put an adhesive coat on top of the printed liner sheet material. After coating the material, it is cut into manageable rolls. The third process is to print the base form. This can be printed on a flexo or offset press. The printing may have printed security features. At this process, the adhesive release coating is printed/applied on the back of the form. When completed, the form is taken to a label applicator.

The fourth process is to attach the liner sheet to the base form. The label applicator has the liner sheet material placed in a dispensing section. The label applicator takes a "patch" of the liner sheet material and places it over the top of the adhesive release coating window that was made on the back of the form. The label applicator, after the liner sheet was placed on the form, then die cuts the window opening on the front of the form. The form is now constructed and can be made into sheets, fanfolds, or rolls.

Although the window decal form of the present invention is particularly suited for use with a laser printer, the form can also be used with a dot matrix printer, thermal printer, ink jet, etc. Additionally, the form may contain other decals and labels per user specification.

With the window decal form of the present invention, a window decal can be processed using a high speed laser printer thereby maintaining high quality printing and achieving rapid production. The label can be readily removed from the form via an adhesive release coating to expose a permanent adhesive surrounding the window decal. With the exposed adhesive, the label and decal can be readily affixed to the inside of a vehicle window or the like.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A window decal form construction comprising:

a liner sheet having a front side and a back side;

an adhesive release coating disposed on the back side of the liner sheet, and applied in a frame, the adhesive release coating frame defining a decal area without adhesive release coating, the decal area and the adhesive release coating defining a label area; and a label affixed to the back side of the liner sheet covering the label area, the label being affixed with a permanent adhesive, wherein the decal area on the front side of the liner sheet is die cut from the liner sheet such that the decal area is removed when the label is peeled from the back side of the liner sheet; and wherein the window decal form is of a construction suitable for a laser printer.

2. A window decal form construction according to claim 1, wherein the adhesive release coating is silicone.

3. A window decal form construction according to claim 1, further comprising perforations around a periphery of the label area.

4. A window decal form construction according to claim 3, further comprising an indicia section containing indicia printed thereon, the perforations being disposed surrounding the indicia section.

5. A window decal form construction according to claim 1, wherein the liner sheet is formed of paper.

6. A window decal form construction according to claim 1, wherein the liner sheet is formed of plastic.

7. A window decal form construction according to claim 1, wherein a thickness of the window decal form is about 5–8 mils.

8. A window decal form construction comprising:

a liner sheet having a front side and a back side; and a label removably affixed to a label area on the back side of the liner sheet, wherein a decal area smaller than and within a periphery of the label area on the front side of the liner sheet is die cut from the liner sheet and permanently affixed to the label such that the decal area is removed when the label is peeled from the back side of the liner sheet; and wherein the window decal form is of a construction suitable for a laser printer.

9. A window decal form construction according to claim 8, further comprising an adhesive release coating on the back side of the liner sheet, the adhesive release coating framing the decal area.

10. A window decal form construction according to claim 9, wherein the label is affixed to the liner sheet with a permanent adhesive, the label being removable with the decal area by virtue of the adhesive release coating.

11. A window decal form construction according to claim 9, wherein the adhesive release coating is silicon.

12. A window decal form construction according to claim 8, further comprising perforations around a periphery of the label area.

13. A window decal form construction according to claim 12, further comprising an indicia section containing indicia printed thereon, the perforations being disposed surrounding the indicia section.

14. A window decal form construction according to claim 8, wherein the liner sheet is formed of paper.

15. A window decal form construction according to claim 8, wherein the liner sheet is formed of plastic.

16. A window decal form construction according to claim 8, wherein a thickness of the window decal form is about 5–8 mils.

17. A method of constructing a window decal form having a construction suitable for a laser printer, the method comprising:

providing a liner sheet having a front side and a back side;

applying an adhesive release coating in a frame on the back side of the liner sheet, the adhesive release coating frame defining a decal area without adhesive release coating, the decal area and the adhesive release coating defining a label area;

affixing a label to the back side of the liner sheet covering the label area, the label being affixed with a permanent adhesive; and die cutting the decal area on the front side of the liner sheet such that the decal area is removed when the label is peeled from the back side of the liner sheet.

18. A method according to claim 17, further comprising forming perforations around a periphery of the label area.

19. A method according to claim 18, wherein the window decal form further comprises an indicia section containing indicia printed thereon, the step of forming perforations further comprising forming perforations disposed surrounding the indicia section.

20. A method according to claim 17, further comprising providing the window decal of a thickness of about 5–8 mils.

* * * * *